United States Patent
Kalal et al.

(10) Patent No.: US 10,061,780 B2
(45) Date of Patent: Aug. 28, 2018

(54) INFORMATION MANAGEMENT COMMAND PROCESS DEVICE

(71) Applicant: Bank of America Corporation, Charlotte, NC (US)

(72) Inventors: Prashant Kumar Kalal, Singapore (SG); Angela Howard, Charlotte, NC (US); Mark A. Frazier, Freeland, MI (US)

(73) Assignee: Bank of America Corporation, Charlotte, NC (US)

( * ) Notice: Subject to any disclaimer, the term of this patent is extended or adjusted under 35 U.S.C. 154(b) by 412 days.

(21) Appl. No.: 14/263,557

(22) Filed: Apr. 28, 2014

(65) Prior Publication Data

US 2015/0310032 A1    Oct. 29, 2015

(51) Int. Cl.
| | | |
|---|---|---|
| *G06F 12/00* | (2006.01) |
| *G06F 17/30* | (2006.01) |
| *G06F 11/30* | (2006.01) |
| *G06F 9/00* | (2006.01) |
| *G06F 9/50* | (2006.01) |
| *H04L 12/26* | (2006.01) |

(52) U.S. Cl.
CPC ........ *G06F 17/30203* (2013.01); *G06F 9/00* (2013.01); *G06F 9/5083* (2013.01); *G06F 11/3055* (2013.01); *G06F 17/30589* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 8,180,846 B1 * | 5/2012 | Zur | ..................... | G06F 11/3006 709/217 |
| 8,516,121 B1 * | 8/2013 | Telang | ................... | H04L 47/25 707/640 |
| 8,516,488 B1 * | 8/2013 | Brown | .............. | G06F 17/30463 707/718 |
| 8,966,493 B1 * | 2/2015 | Richards | ............... | G06F 9/4887 718/104 |

(Continued)

OTHER PUBLICATIONS

Restart Without Starting Over: Ensure DB2 on z/OS, IMS, and VSAM Availability—2010—BMC Software, 10 pages.

(Continued)

*Primary Examiner* — David T Brooks
(74) *Attorney, Agent, or Firm* — Banner & Witcoff, Ltd.; Michael A. Springs (57) ABSTRACT

An illustrative method for providing a job to an information management system may include monitoring, by a command processing device such as a command processing tool operating on one or more computing devices, operation of a series of commands communicated to at least one information management system via a communication link. The command processing device may determine a status associated with one or more commands of the series of commands based on the operation of the command in the information management system. The command processing device may be configured for controlling a rate at which the series of commands is communicated to the information management system based, at least in part, on the status of one or more of the commands.

16 Claims, 3 Drawing Sheets

(56) References Cited

U.S. PATENT DOCUMENTS

| | | | | |
|---|---|---|---|---|
| 9,277,452 | B1* | 3/2016 | Aithal | H04W 28/10 |
| 2003/0135639 | A1* | 7/2003 | Marejka | H04L 47/10 |
| | | | | 709/232 |
| 2007/0058547 | A1* | 3/2007 | Berstis | G06F 9/5072 |
| | | | | 370/232 |
| 2007/0094662 | A1* | 4/2007 | Berstis | G06F 9/505 |
| | | | | 718/102 |
| 2008/0244099 | A1* | 10/2008 | Machida | G06F 11/0745 |
| | | | | 710/6 |
| 2009/0077233 | A1* | 3/2009 | Kurebayashi | G06F 9/4843 |
| | | | | 709/224 |
| 2012/0005361 | A1* | 1/2012 | Knittle | H04L 12/66 |
| | | | | 709/231 |
| 2013/0138830 | A1* | 5/2013 | Fang | H04L 47/263 |
| | | | | 709/233 |
| 2014/0089459 | A1* | 3/2014 | Werr | H04L 67/06 |
| | | | | 709/217 |
| 2014/0149982 | A1* | 5/2014 | Asayag | G06F 9/45533 |
| | | | | 718/1 |
| 2015/0207840 | A1* | 7/2015 | Lee | H04L 65/80 |
| | | | | 709/231 |

OTHER PUBLICATIONS

IBM IMS Workload Router for z/OS, Version 2 Release 7—User's Guide—2011—IBM, 118 pages.
IBM IMS Queue Control Facility for z/OS, Version 3 Release 1—User's Guide—2012—IBM, 542 pages.
IBM IMS Command Control Facility for z/OS, Version 2 Release 2—User's Guide—Aug. 2013—IBM, 190 pages.

* cited by examiner

INFORMATION MANAGEMENT COMMAND PROCESS DEVICE

BACKGROUND

Many organizations may possess large volumes of information about business functions, such as customer information, product information, and the like. Large organizations, such as large banks and other financial services institutions, may obtain information about business functions in a variety of different contexts, such as checking and savings account transactions, mortgage account transactions, credit card account transactions, commercial and consumer loan transactions, and investment transactions. Such information may be obtained through a variety of business channels, including but not limited to in-person meetings, telephone conversations, written forms, and interactions with automated kiosks, automatic teller machines and Internet or intranet websites. This information may also be obtained by a large organization in a variety of formats. It is not uncommon, for example, for a large organization to maintain several business information databases, each with its own data storage and input formats.

Often, an organization may use an information management system to store and/or manage information related to the organization's operations. In some cases, such as when a business maintains several business information databases, the organization may use one or more information management systems to manage the information stored within the data repositories. In some cases, these information management systems may be centrally located. In others, the information management systems may be distributed over two or more different facilities. The organization may maintain one or more centrally located computer devices, such as mainframes, servers, and the like, to implement one or more information management systems that may be communicatively coupled via a network. In some cases, the organization may use one or more software packages to coordinate operation of the one or more information management systems associated with the organization.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some cases, a method for controlling the operation of a job in an information management system may include monitoring, by a command processing device (e.g., a command processing tool operating on one or more computing devices), operation of a series of commands communicated to at least one information management system via a communication link. The command processing device may further be configured for determining a status associated with one or more commands of the series of commands based on the operation of the command in the information management system and controlling a rate at which the series of commands is communicated to the information management system based, at least in part, on the status of one or more of the commands.

In some cases, a system for controlling the operation of a job in an information management system may include a data repository for storing hierarchical business information and two or more database management devices (e.g., a transaction manager device) communicatively coupled to the data repository. The database management devices may be configured for processing commands for managing data within the data repository. The system may further include a command processor device that may include a processor and a non-transitory memory device. The memory device may store instructions, that when executed by the processor, cause the command processor device to receive, via a network, a command file (e.g., a flat file) including commands for managing data within the data repository and communicate a series of commands to each of the two or more database management devices. In some cases, each series of commands may be executed from the command file. The instructions, when executed by the processor, may further cause the command processor device to monitor, via a network, operation of the two or more transaction devices (e.g., database managers) of an information management system to determine a status of each of two or more information management systems. In some cases, the database managers may communicate a series of commands to the two or more information management systems based on the status of the two or more information management systems.

In some cases, an illustrative non-transitory computer readable storage medium may be used for storing computer-executable instructions that, when executed, cause a processor to perform a method comprising (1) processing a command file received from a user, the command file including commands for performing operations on data stored within a data repository (e.g., a database) and/or objects (e.g., a transaction, a program, and the like) associated with at least one information management system, (2) monitoring operation of a series of commands created from the command file and communicated to the at least one information management system via a communication link, and (3) controlling a rate at which the series of commands is communicated to the information management system based, at least in part, on a status received from the at least one information management system.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
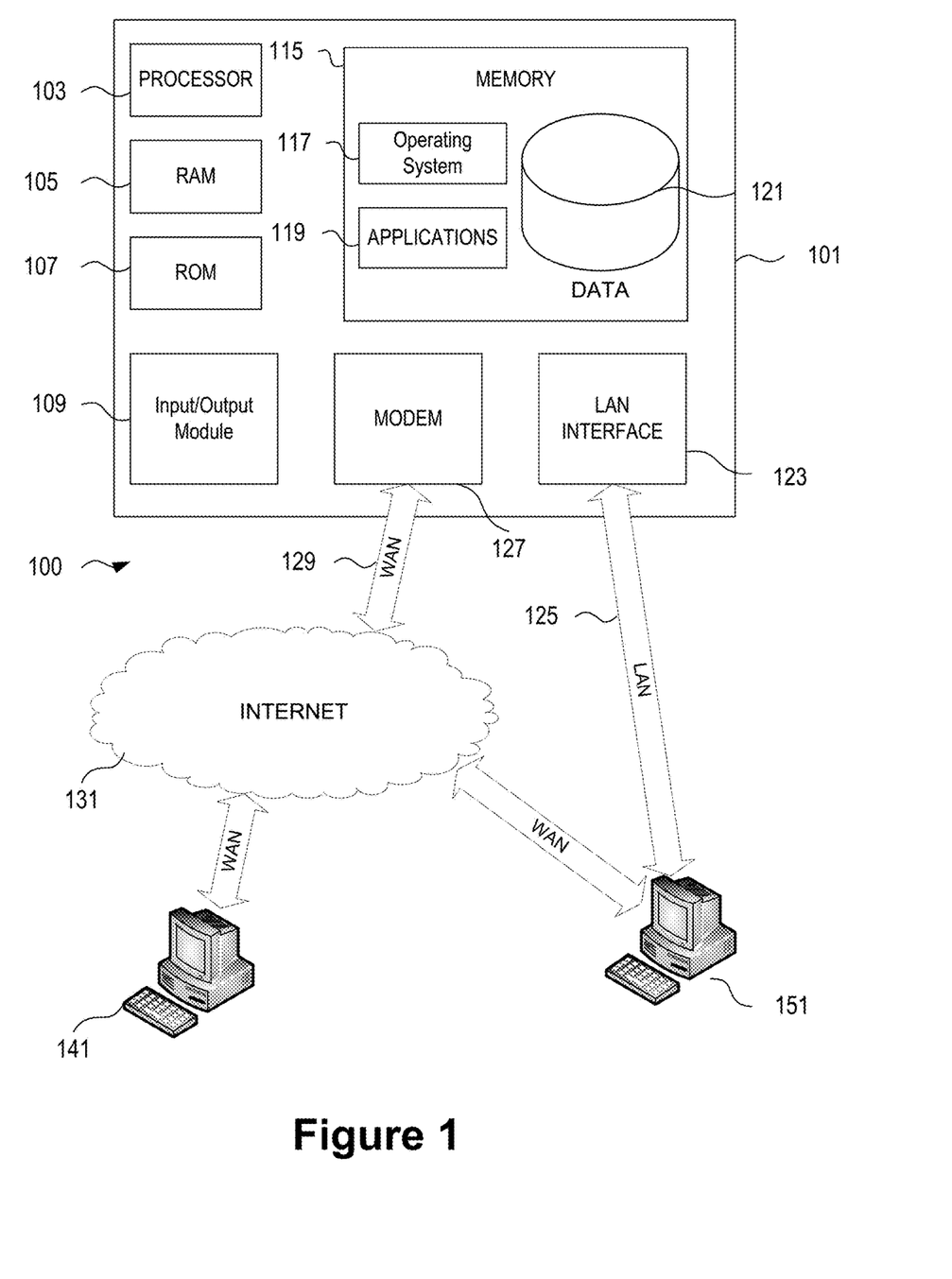
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output (I/O) module 109, and a memory 115.

The I/O module 109 may include a microphone, keypad, touch screen, and/or stylus through which a user of the computing device 101 may provide input, and may also include one or more of a speaker for providing audio output and a video display device (e.g., a user interface) for providing textual, audiovisual and/or graphical output. Software may be stored within the memory 115 and/or other storage to provide instructions to the processor 103 for enabling the server 101 to perform various functions. For example, the memory 115 may store software used by the server 101, such as an operating system 117, one or more application programs 119, and an associated database 121. Alternatively, some or all of the computer executable instructions utilized by the computing device 101 may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as the terminals 141 and 151. The terminals 141 and 151 may be personal computers or servers that include many or all of the elements described above relative to the server 101. The network connections depicted in FIG. 1 may include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the server 101 may include a modem 127 or other means for establishing wired and/or wireless communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

The computing device 101 and/or the terminals 141 or 151 may also be mobile terminals (e.g., a cell phone, a tablet computer, a laptop computer, a smart phone, and the like) that may include various other components, such as a battery, speaker, and/or antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules may include routines, programs, objects, components, data structures, and the like for performing particular tasks or implementing particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
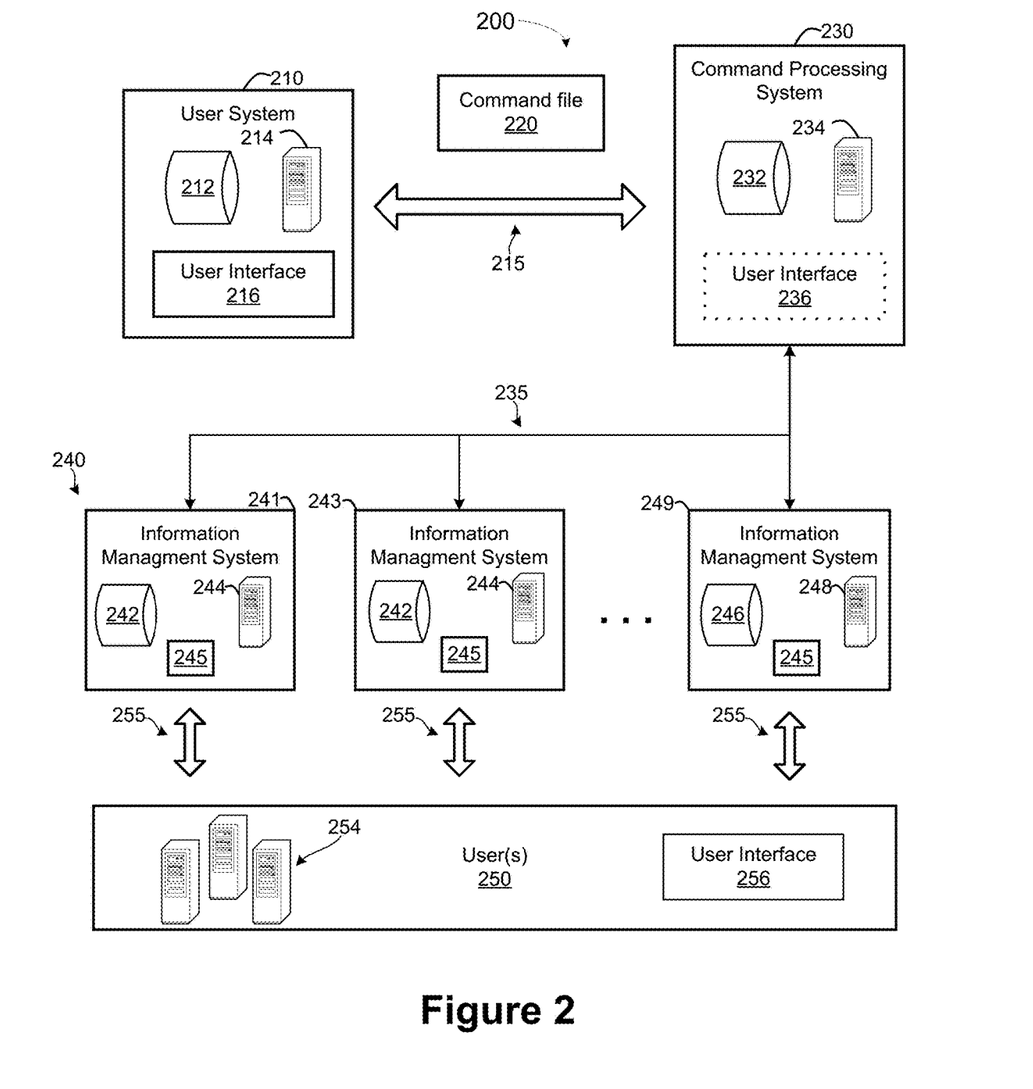
FIG. 2 is an illustrative block diagram of a system for controlling the flow of commands to be processed in an information management system according to one or more aspects of the present disclosure.

FIG. 2 is an illustrative block diagram of a system 200 for controlling the flow of commands to be processed in one or more information management systems 240 according to one or more aspects of the present disclosure. The system 200 may include a user system 210 communicatively coupled to a command processing system 230 via a network 215. The user system 210 may be configured to communicate a command file 220 to a command processing system 230. The command file 220 may include one or more instructions for performing data management activities on data associated with objects such as databases, transactions, and/or programs stored within the information management system 240. In some cases, the command processing system 230 may process the command file 220 to produce one or more command streams to be communicated to the information management system 240 via a network 235. The information management system 240 may include one or more data repositories 242, 246 and one or more computer devices 244, 248. In some cases, one or more end users 250 may perform activities that access and/or store data within the information management system via a network 255. In some cases, the end users 250 may be employees and/or customers of the organization.

For example, according to one or more aspects, the end users 250 (e.g., a customer, an employee, and the like) may be associated with a financial institution, such as a bank. Various computer devices 254 (e.g., workstations, the user interface 256, and the like) may be located within the financial institution and/or may be located remotely from the financial institution. For instance, one or more computer devices 254 may be located within a facility of a financial institution. The computer devices 254 may include a workstation or other such device that may be used, for example, by customer service representatives, other employees, and/or customers of the financial institution in conducting financial transactions via network 203. Additionally or alternatively, one or more computer devices 254 may be located at a user location (e.g., a customer's home or office). Such workstations also may be used, for example, by customers of the financial institution in conducting financial transactions via computer network 255. Information about the financial transactions and/or other business related activities may be stored in the data repository 242 by the information management system.

The user system 210 may include a data repository 212, a server 214 and a user interface 216. In some cases, the user system 210 may be used to allow a user to issue commands and/or receive command responses, such as by using the user interface 216. In an example, the information management system 240 may be associated with a command interface including one or more simple interface commands that may be used to manage the operation of the information management systems and/or resources. Command may be entered via the user interface 216 to create customized applications for managing data within the information management system 240. In some cases, the data repository 212 may be used to store instructions that may be processed by a processor of the server 214 to facilitate the creation of a command file 220 that may be used to perform monitoring and/or data management functions on the information management systems 240.

In an illustrative example, the user system 210 may be used to issue commands to the information management system 240 via a network. Once processed, the information management system 240 may communicate a message in response to the issued commands. In some cases, the message may include status information about the command, status information about the information management system, and/or other data. In some cases, the server 214 may be used to issue commands as a batch job. The batch job may include a series of commands, such as the command file 220 that may be executed serially by an information management system. Upon receipt of a command, the information management system 240 may respond with a response message. The response message may be used to acknowledge receipt of the command, data requested from the data repository 242, and/or may include status information about the command. For example, the command response may include a command status (e.g., in progress, completed, and the like), a time stamp, an error message, and/or other data corresponding to the particular issued command.

In some cases, the information management systems 240 may include one or more computer devices 244, 248 (e.g., one or more servers, a mainframe, and the like) that may be configured to store and/or manage information in a data repositories 242, 246 (e.g., a hierarchical database). In some cases, the information management system 240 may include a software application (e.g., a database manager 245) for managing data intensive operations with the data stored in the database. For example the database manager 245 may be used to process one or more commands received from the user system 210. The data repository 242, 246 may include one or more databases in one or more different formats. For example, a hierarchical database may be configured as a "full function" database that may be accessible using one or more different methods, including a hierarchical direct access method, a hierarchical indexed direct access method. In some cases, the data repository 242 may include a database designated as a "fast path" database that may optimized for a high transaction rate. In other cases, the database may be a "high availability large database", which may be configured to manage an extremely large data volume. In some cases, a data repository 242 may be mirrored in one or more different data repositories (e.g., data repository 246) to facilitate a distributed user base and/or a high number of transactions.

In some cases, the information management system 240 may include the database manager 245 to allow a user, or an application running on a computer device, to interact with the information management system 240 via one or more commands. The database manager 245, or other application, may be configured to allow the business organization, or other user, the ability to process one or more business functions (e.g., a financial transaction, a credit card transaction, a mortgage account transaction, and the like.). For example, the database manager 245 may be implemented as instructions stored in a memory device of the computer device 244. Often, the information management system 240 may include an interface to access, query, and/or update one or more types of database, such as via the network 255.

In many cases, the information management system 240 may be configured to process commands serially. For example, one or more commands may be communicated to the information management system 240 from a user system 210. In some cases, the commands may be processed as they are received. In other cases, the commands may be stored in a message queue before being processed. The information management system may be configured to use a scheduler to process one or more serial commands. A particular business transaction, or other data management activity, may be performed using the serial commands. For example, the database manager may process the commands to read and/or update the particular database to ensure that a transaction or other activity is performed, as desired. In some cases, the information management system 240 may communicate a message back to a sending device, such as to provide information about the operation of a particular command. Once the outgoing message is complete, the information management system 240 may send the message, such as to a user system 210, to provide feedback about the status of an individual command or series of commands (e.g., a particular transaction). For example, the message may be presented to a user via the user interface 216. Often, the database manager 245 of the information management system 240 may be capable of performing multiple (e.g., tens, hundreds, thousands, and the like) of commands per unit of time (e.g., a second, a minute, and the like). In such cases, a series of commands may be communicated to the information management system 240 as a batch job.

In some systems, multiple users 250 and/or user systems 210 may attempt to access the information management system within a same time period. In such cases, the information management system 240 may experience periods of heavy traffic and periods of lighter traffic. However, the information management system 240 typically is not configured to adjust the processing of commands differently during times of heavy transaction loads. Because the information management system 240 processes commands serially, the command processing activities may run inefficiently. In other cases, when an error occurs during command processing, the information management system 240 may stop processing commands. Often, during these times, a user may be required to resolve any errors before restarting the particular job from the beginning. In some cases, the user may desire to restart the command processing at a different location within the command stream. However, in such cases, the user may be required to rewrite the batch job file if the user desires to restart the processing at the command that experienced the error. During this downtime, the business organization may experience a financial loss due to the information management system 240 being taken offline until the error can be resolved. As such, it is desirable to have a command processing system 230 that may provide a business user greater control over the commands being sent to the information management system 240 for processing.

The command processing system 230 may include a data repository 232 and a computer device, such as the server 234. The data repository 232 may include one or more memory devices capable of storing the command file 220 received from the user system 210 via the network 215. In some cases, the command processing system may include a user interface 236 to allow a user to customize operation of the command processing system. For example, the user may use the user interface 236 to review the command file, to monitor the operation of one or more command streams sent to the information management system 240, and/or to set one or more operation parameters such as an error response setting (e.g., ignore, retry, stop), a number of retries, a target utilization rate of the information management system, and/or the like. As discussed above, the command file 220 may include one or more commands formatted as a batch file. For example, the command file may include a large series of commands (e.g., hundreds and/or thousands of commands) that may be executed when performing data management activities on the information management system 240.

The command processing system 230 may automate processing of the command file 220 to allow for greater flexibility and/or more efficient processing of the commands by the information management system 240. For example, the command processing system 230 may receive the command file 220 and may parse the command file to create one or more streams of commands to be sent to the information management system 240 for processing. In doing so, the command processing system 230 may allow for greater flexibility and control in managing the operation of the information management system components (e.g., databases, transactions, programs, and the like). In some cases, the method of communicating commands to the information management system 240 via the network 235 may be related to a system load experienced by one or more information management systems 240. For example, during times when the database 242, 246 may experience a high level of traffic, such as during peak business hours, the command processing system 230 may be configured to send commands differently. For example, when the information management systems are experiencing light loading, the command processing system 240 may communicate a command to each information management system 241, 243, 249 in parallel (e.g., at approximately the same time). However, during expected times of high loading, the command processing system 230 may be configured to send a command to each information management system 241, 243, 249 serially. For example, the command processing system 230 may send a command to the first information management system 241 and wait for notification that processing has been completed. Once the notification has been received the command processing system 230 may communicate the command to the next information management system 243, and so on.

In some cases, the command processing system 230 may be configured manually by a user. In other cases, the command processing system 230 may be configured to automatically determine times at which the information management systems 240 experience a high level of loading and/or times the information management system 240 are likely to experience a high level of loading. Once determined, the command processing system may determine appropriate times at which commands may be sent in parallel to the different information management system 240 and appropriate times at which commands may be sent serially. Because command processing by the information management systems 240, may be more efficient when the same command is sent in parallel to the different ones of the information management systems 240, the command processing system 230 may be configured to send commands in parallel as a default setting. As an illustration, a command may be processed by the information management system 240 in approximately 0.2 seconds. However, the same command, when sent serially by the command processing system 230 may be processed in a significantly longer time (e.g., about 1 second).

In some cases, the information management system 240 may be distributed between different sites and/or machines. For example, a distributed information management system may include two or more different systems 241, 243, 249. Each system may be implemented on a single device or on different computer devices 244, 248. In some cases, a same data repository 242 may be shared between the systems 241, 243. In other cases, a system 249 may include a data repository 246 that may be a copy (e.g., a "mirror") of the data repository 242 at a different site. In such cases, the command processing system 230 may stream commands from the same command file 220 to two or more of the different systems 241, 243, 249. In doing so, the command processing system 230 may allow for more efficient processing of the command file 220 by allocating different portions of the same command file 220 to be processed in parallel by the different systems. For example, a first series of commands may be extracted from the command file 220 and communicated to the first system 241 for processing, a second series of commands may be extracted from the command file 220 and streamed to the second system 243 for processing and a third series of commands may be extracted from the command file 220 and streamed via the network 235 for processing by the third system 249.

In addition to a user configuring the command processing system 230 for sending commands in parallel or serially, the command processing system 230 may also be capable of automatically determining when to send commands in parallel or serially to the different systems 241, 243, 249 within the information management system 240. For example, the command processing system may monitor and/or request loading information about the different systems 241, 243, 249 and determine a system load for each of the systems 241, 243, and/or 249. Once the system loads are determined, the command processing system 230 may communicate commands from the command file 220 based on the system load of each of the different systems. For example, during a particular time period, the command processing system 230 may determine that the system resources (e.g., the data repository 242) may experience a high level of loading during a particular time period. As such, the command processing system may then communicate commands serial to the first system 241, to the second system 243 when the first system completes processing, and so on. During times of lighter system loading, the command processing system 230 may communicate commands to the information management systems 240 serially. In some cases, the command processing system 230 may set a threshold value to define a maximum system load at which to stream commands to the information management system 240 in parallel. When the threshold has been reached, the command processing system 230 may then communicate the commands to the different systems 241, 243, 249 in parallel. When the system load is less than the threshold value, the command processing system may be configured to communicate the commands to the different systems 241, 243, 249 in parallel.

In some cases, the command processing system 230 may be configured to determine a usage pattern of the information management system 240 based, at least in part, on usage patterns of the different systems 241, 243, 249 by the users 250. In an illustrative example, each system 241, 243, 249 may be configured to support users in a particular geographic region. (e.g., the Americas, Europe, Asia, etc.). Due to time zone differences between the regions, each system may experience different system load patterns. For example, during local business hours, a particular one of the systems 241, 243, 249 may experience heavier system loads and lighter system loads during times outside normal business hours. Using this information, the command processing system 230 may schedule commands to be communicated to a particular system at serially during times outside of normal business hours of the local region.

In some cases, such as during error conditions or times of heavy system loading, the information management system 240 may be "locked out" and kept from performing commands. In such times, the command stream may be paused until the particular condition has been cleared. During the lock-out time, the command processing system 230 may be configured to wait for a specified period of time before continuing to stream commands. For example, a user, via the user interface 216, may specify a particular time period to wait before retrying to send the command. In other cases, the user may cause the command stream to pause until a manual retry command is given by the user via the user interface 216. In some cases, the command processing system 230 may be configured to automatically retry the command until allowed to proceed. In such cases, the user may specify a minimum and/or maximum number of retries to be performed. In other cases, the user may specify a time to wait between retries. In some cases, this wait time may be a constant value (e.g., 5 seconds). In other cases, the wait time may be variable. For example, the wait time may begin at a specified value (e.g., 5 seconds) and gradually increase after subsequent retries (e.g., 10 seconds, 1 minute, and the like). In some cases, a maximum wait time may be set (e.g., 1 hour). To increase the flexibility of this feature, each system 241, 243, 249 may be associated with a set of parameters corresponding to a desired functionality for the individual system.

In some cases, the command processing system 230 may be configured with a programmable error handling functionality. For example, in many information management systems, processing of commands may be halted after an error has occurred. In such cases, the information management system may not begin processing commands until that particular error condition was cleared. In some cases, upon restart, command processing may resume at the same point at which the error occurred. In other cases, command processing may resume from the beginning command of a batch job. As such, it is desirable for the command processing system 230 to provide flexibility for both reacting to errors and for resuming command processing after an error condition had been resolved.

In some cases, a user may be allowed to specify an error reaction for the command processing system 230 when an error condition has been detected. For example, the command processing system 230 may include a configurable error reaction, such that an error condition may stop processing of commands, may begin a retry process for a particular command, or the command processing system may be configured to ignore an error. In some cases, the error reaction functionality may provide similarly defined error reaction for a majority of errors. In other cases, different error reaction functionality may be defined for different classes of errors. For example, for more serious error conditions, the command processing system 230 may be configured to stop all processing of commands from the command file. For lesser errors, the command processing system 230 may be configured to retry the particular command. For certain errors and/or classes of errors, the command processing system 230 may be configured to ignore the error and continue streaming commands to the information management system 240. In some cases, the command processing system 230 may be configured to determine whether the error is local to a particular system 241, 243, 249 of the information management system. If so, the command processing system 230 may determine an error reaction based, at least in part, on which particular system 241, 24, 249 is experiencing an error. For example, if the system 241 is experiencing an error, the command processing system 230 may operate according to an error reaction programmed for system 241. Command processing may continue as before on the other systems 243. In some cases, the command processing system 230 may be configured to re-allocate commands from one command stream to another. For example, when a system 241 experiences an error, the command processing system 230 may reallocate commands from a command stream for the system 241 to the command stream for either one or both of the system 243 and 249.

In some cases, the command file 220 may be associated with a particular set of input commands associated with the execution of a specific business application (e.g., a process, a job, and the like). For example, a command that begins the application program and returns a result may be considered a single transaction, where a job may include numerous transactions. In some cases, the command processing system 230 may be configured to control the rate and/or pacing at which commands are communicated to the information management system 240 on the job level. In some cases, the command processing system 230 may include a scheduling tool. For example, the scheduling tool may be used to coordinate processing of different jobs. For example, the command processing system 230 may receive two or more different command files, each associated with a different business function, or job. The command processing system 230 may then coordinate running the different jobs such as by scheduling when, and by which system, a particular job is to be performed. In some cases, the different jobs may be associated with a same information management system 230. In other cases, the each of the different jobs may be associated with a different information management system.

When two or more jobs are associated with the same information management system, the control processing system 230 may be configured to determine an order of execution for the different jobs. In some cases, the order of execution may be associated with a time at which the command processing system 230 received the particular job. In other cases, each particular job, or class of job, may be assigned a priority, either by the system 200 or by a user via the user interface 216. A scheduling tool may be incorporated to facilitate efficient processing by the command processing system 230. In some cases, the scheduling tool may include instructions stored in the data repository 232 that may be processed by the server 234. This scheduling tool may determine a priority based on a type of job and/or a time that a job has been received at the command processing system 230. For example, a job configured to correct an error condition in the information management system 240 may have a higher priority than a job to archive information stored in the information management system 240. In such cases, the higher priority job may take precedence over the lower priority job. For example, a lower priority job may be paused and/or stopped so that the higher priority job may be started. In other cases, the lower priority job may be allowed to complete, however no lower priority job may be started until after the higher priority jobs complete. In some cases, the command processing system may allocate system resources such that two or more different jobs may be run in parallel on different systems 241, 243, 249. For example, commands associated with a high priority job may be streamed at a first rate to a first system, such as a system having the lowest processor utilization. Meanwhile, commands to one or more different lower priority jobs may be streamed to different systems, where the other systems may have higher processor utilization. In some cases, when a higher priority job is received by the command processing system 230, a lower priority job may be reallocated from a command stream to a first system (e.g., a system 241 having the lowest processor utilization) to a different second system (e.g., system 243, 249).

Figure 3:
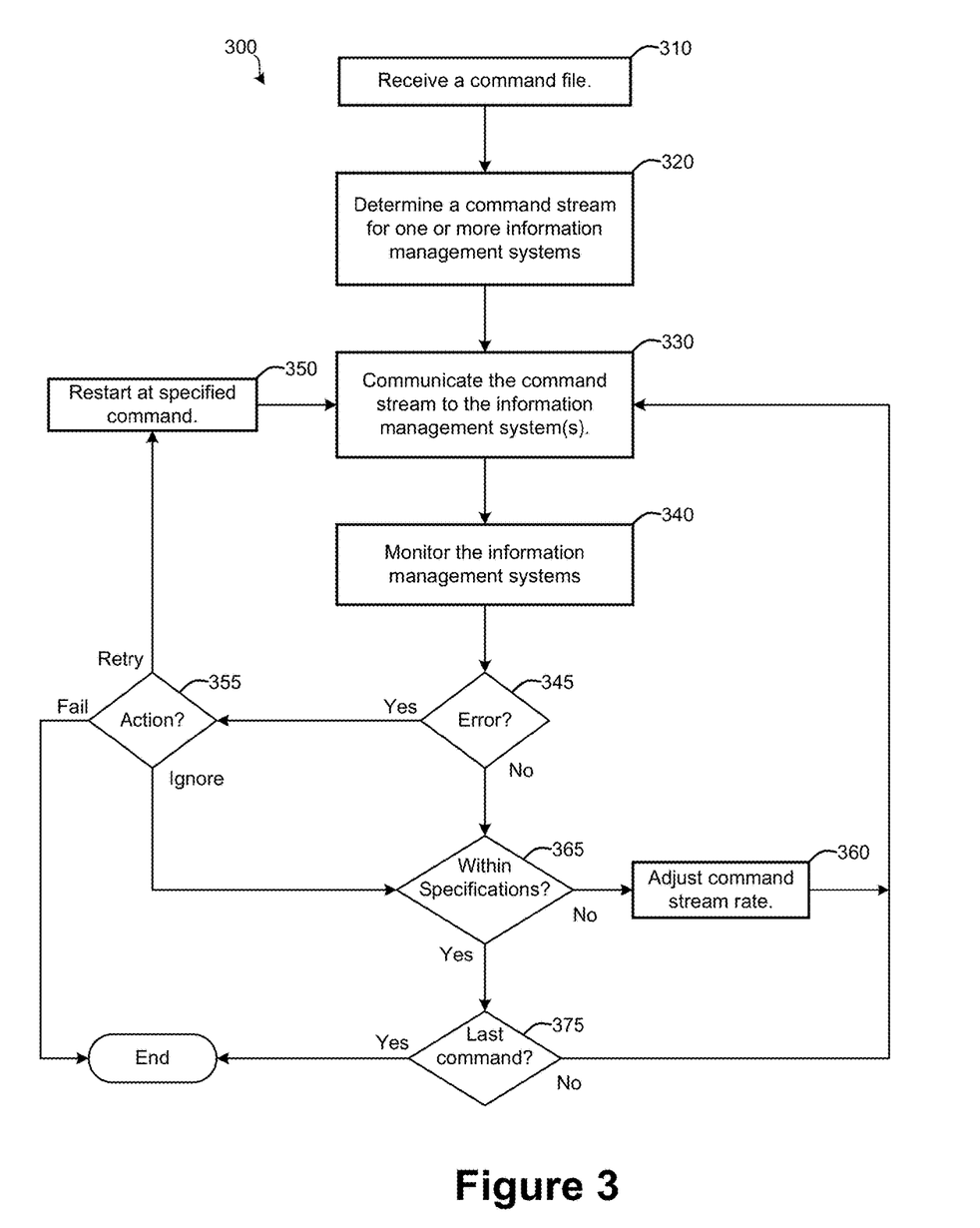
FIG. 3 is a flowchart of an illustrative method for controlling the flow of commands to be processed in an information management system by the system of FIG. 2 according to one or more aspects of the present disclosure.

FIG. 3 is a flowchart of an illustrative method 300 for controlling the flow of commands to be processed in an information management system by the system of FIG. 2 according to one or more aspects of the present disclosure. At 310, a command file may be received by a command processing system 230. For example, a user may specify a job (e.g., a business application) to be run on information stored in the information management system 240. In some cases, the user system may automatically send a command file for a scheduled job. For example, the user system 210 may be configured to automatically create a job (e.g., an archive function) to be run on information stored in the information management system 240. Once received, the command processing system 230, at 320, may determine a command stream to be sent to the information management system 240 based on commands included in the command file. In some cases, the command processing system 230 may use other information, such as processor utilization information, system status information, and/or the like to determine one or more command streams and/or the rate of communication for the command streams to the information management system 240. At 330, the command processing system 230 may communicate a command stream to the information management system 240 via the network 235 at a particular rate.

At 340, the command processing system 230 may monitor the operation of the information management system 240 in response to the stream of commands. In some cases, the command processing system receives one or more messages in response to the commands. The command processing system 230 may also be configured to monitor a status of one or more components of the information management system 240. For example, the command processing system 230 may be configured to monitor the system load of one or more devices (e.g., the computer devices 244, 248, the data repositories 242, 246, and the like). Based, at least in part, on information received during the monitoring of the information management system 240 operations, the command processing system 230 may determine whether an error condition is present at 345.

If an error condition was recognized at 345, the command processor system 230 may determine an action to take in response to the error at 355. For example, the command processing system 230 may be configured to check an error reaction parameter. For example, at 355, the command processing system 230 may be configured to retry an action. If so, at 340, the command processing system 230 may re-send the command stream to the information management system 240. In some cases, the command stream may begin by re-sending the same command that encountered the error condition. If, so, the command processing system may wait for a specified period of time before re-sending the command. After the command stream has been restarted at 350, the command processing system continues sending the command stream 330 and monitoring the information management system at 340.

Returning to 355, in some cases, the error reaction parameter is set to stop sending the command stream in response to an error condition, at which time the job ends. If, at 355, the error response parameter is set to ignore at least a specified error or class of errors, or no error was recognized at 345, the command processing system 230 may check at 365 whether the command stream is operating within specified operating conditions. For example, the command processing system 230 may determine whether a component of the information management system is operating within specifications (e.g., whether a device utilization parameter is within a specified range and/or within a specified limit). If not, the command processing system may adjust a rate at which commands are being sent to the information management system and/or a system 241, 243, and 249 to which the commands are being sent. Once adjusted, the command processing system 230 continues to communicate the command stream to the information management system at 330. If at 365, the information management system is operating within specifications, the command processing system 230 determines whether the last command in the stream has been sent at 375. If so, the job ends. If not, the communication management system 230 continues to communicate the command stream to the information management system at 330.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
    receiving, by a command processing device, two or more command files, wherein a first command file includes a first series of commands including one or more commands to be run by at least one information management system and a second command file includes a second series of commands including one or more commands to be run by the at least one information management system and wherein each of the two or more command files is associated with a different job to be performed;

associating, by the command processing device, a first priority to the first series of commands based on a first job associated with the first series of commands;

associating, by the command processing device, a second priority to the second series of commands based on a second job associated with the second series of commands;

monitoring, by the command processing device, operation of the first series of commands from the first command file communicated to the at least one information management system via a communication link, wherein a first rate at which the first series of commands is communicated is based on a first job type of the first job;

determining a status associated with one or more commands of the first series of commands based on the operation of the one or more commands in the at least one information management system; and communicating by the command processing device, the second series of commands to the at least one information management system based, at least in part, on the status associated with the one or more commands of the first series of commands, wherein a second rate at which the second series of commands is communicated is based on a second job type of the second job; and adjusting, by the command processing device, the second rate at which the second series of commands is communicated to the at least one information management system based upon whether a status of the at least one information management system meets a criterion, wherein the criterion is associated with a period of high transaction loading at the at least one information management system or a criterion associated with a period of low transaction loading at the at least one information management system and wherein the second series of commands is communicated in parallel when the status of the information management system corresponds to a low transaction loading state and wherein the second series of commands is communicated in serial when the status of the information management system corresponds to a high transaction loading state.

2. The method of claim 1, comprising:
determining, by the command processing device, a second status of the at least one information management system; and
controlling the second rate at which the second series of commands is communicated to the at least one information management system based on the second status of the at least one information management system.

3. The method of claim 1, comprising:
determining, by the command processing device, a portion of the first command file to be sent to a first information management system based on at least one of the status of the first information management system and a command execution status.

4. The method of claim 1, further comprising:
determining whether a command execution was unsuccessful at the information management system; and when unsuccessful, retrying the execution of an unsuccessful command for a specified number of times.

5. The method of claim 4, further comprising:
pausing execution of the second series of commands by the information management system for a predetermined period of time; and
after the predetermined period of time, restarting execution of the second series of commands at a specified command within the second series of commands.

6. The method of claim 5, wherein command execution restarts following an error condition at a command different than the unsuccessful command which caused the error.

7. A system comprising:
a data repository for storing hierarchical business information;
two or more information management systems communicatively coupled to the data repository, the two or more information management systems configured for processing commands for managing data within the data repository; and
a command processor device including a processor and a non-transitory memory device, the memory device storing instructions, that when executed by the processor, cause the command processor device to:
receive, via a network, a command file including a plurality of commands for managing data within the data repository;
communicate a first series of commands to a first information management system of the two or more information management systems at a first priority associated with a first job type corresponding to the first series of commands and a second series of commands to a second information management system of the two or more information management systems at a second priority associated with a second job type corresponding to the second series of commands, wherein each series of commands are created from the command file;
monitor, via the network, operation of the two or more information management systems to determine a status of each of the two or more information management systems;
communicate the series of commands to the two or more information management systems based on the status of the two or more information management systems, wherein a first communication rate for the first series of commands is dependent upon the status of the first information management system and a second communication rate for the second series of commands is dependent upon the status of the second information management system; and
adjust the second rate at which the second series of commands is communicated to the second information management system based upon whether the status of the second information management system meets a criterion, wherein the criterion is associated with a period of high transaction load at the at least one information management system or a criterion associated with a period of low transaction load at the second information management system and wherein the second series of commands is communicated in parallel when the status of the second information management system corresponds to a low transaction load state and wherein the second series of commands is communicated in serial when the status of the second information management system corresponds to a high transaction load state.

8. The system of claim 7, wherein the non-transitory memory device is further storing instructions, that when executed by the processor, cause the command processor device to:
- receive status information from the first information management system;
- receive status information from the second information management systems; and
- communicate the series of commands to the first information management system and the second information management system based on a second status identified from the status information received from the first information management system and the second information management system.

9. The system of claim 8, wherein the first series of commands is communicated to the first information management system in series communication with the second series of commands communicated to the second information management system.

10. The system of claim 7, further comprising a user interface device communicatively coupled to the command processor device, wherein the user interface device is configured to present information to a user resulting from the operation of the commands contained in the command file after execution by the two or more information management systems.

11. A non-transitory computer-readable storage medium storing computer-executable instructions that, when executed, cause a processor to perform a method comprising:
- processing a command file received from a user, the command file including commands for performing operations on data stored within a data repository associated with two or more information management systems;
- associating a priority to the commands based on an associated job type;
- generating a series of commands based on the command file to be processed by the two or more information management systems;
- monitoring operation of the series of commands created from the command file when communicated to each of the two or more information management systems via a communication link; and
- modifying a communication method in which the series of commands are communicated to the two or more information management systems based, at least in part, on a transaction loading status received from at least one of the information management systems, wherein the series of commands are communicated to the two or more information management systems in parallel communication when a first threshold associated with low transaction load conditions is met or communicated to the two or more information management systems in series communication when a second threshold associated with high transaction load conditions is met for at least one of the two or more information management systems.

12. The non-transitory computer-readable storage medium of claim 11, storing instructions, that when executed by the processor cause the processor to perform the method comprising:
- determining a second status of each of the two or more information management systems.

13. The non-transitory computer-readable storage medium of claim 11 storing instructions, that when executed by the processor cause the processor to perform the method comprising:
- determining a portion of the command file to be sent to a first information management system based on at least one of the status of the first information management system and a command execution status.

14. The non-transitory computer-readable storage medium of claim 11 storing instructions, that when executed by the processor cause the processor to perform the method comprising:
- determining whether command execution was unsuccessful at the two or more information management systems; and
- when unsuccessful, retrying the execution of the command for a specified number of times.

15. The non-transitory computer-readable storage medium of claim 14 storing instructions, that when executed by the processor cause the processor to perform the method comprising:
- pausing execution of the series of commands by the at least two information management systems for a predetermined period of time; and
- after the predetermined period of time, restarting execution of the series of commands at a specified command within the series of commands.

16. The non-transitory computer-readable storage medium of claim 15 storing instructions, that when executed by the processor cause the processor to perform the method wherein command execution restarts following an error condition at a command different than the command which caused the error.

* * * * *